United States Patent
Hagari

(10) Patent No.: US 10,724,461 B2
(45) Date of Patent: Jul. 28, 2020

(54) CONTROLLER AND CONTROL METHOD FOR INTERNAL COMBUSTION ENGINE

(71) Applicant: Mitsubishi Electric Corporation, Tokyo (JP)

(72) Inventor: Hideki Hagari, Tokyo (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 80 days.

(21) Appl. No.: 16/107,095

(22) Filed: Aug. 21, 2018

(65) Prior Publication Data
US 2019/0178191 A1    Jun. 13, 2019

(30) Foreign Application Priority Data
Dec. 7, 2017   (JP) .................. 2017-234809

(51) Int. Cl.
*F02D 41/22*    (2006.01)
*F02D 41/14*    (2006.01)
*F02D 41/00*    (2006.01)
*F02D 35/02*    (2006.01)
(Continued)

(52) U.S. Cl.
CPC .......... *F02D 41/22* (2013.01); *F02D 35/024* (2013.01); *F02D 41/0097* (2013.01); *F02D 41/1498* (2013.01); *B60W 10/06* (2013.01); *F02D 41/0047* (2013.01); *F02D 2200/101* (2013.01); *F02D 2200/1012* (2013.01); *F02D 2200/1015* (2013.01); *G01M 15/11* (2013.01)

(58) Field of Classification Search
CPC .. F02D 41/22; F02D 41/1498; F02D 41/0097; F02D 35/024; F02D 2200/1012; F02D 2200/101; F02D 41/0047; F02D 2200/1015; B60W 10/06; G01M 15/11
See application file for complete search history.

(56) References Cited

U.S. PATENT DOCUMENTS

| 7,536,902 B2* | 5/2009 | Tsukamoto | ............ G01M 15/11 73/114.04 |
| 8,909,403 B2* | 12/2014 | Yokouchi | ............... B60K 6/445 701/22 |
| 9,857,273 B2* | 1/2018 | Hozumi | ................. G01M 15/11 |

(Continued)

FOREIGN PATENT DOCUMENTS

| JP | 3495463 B2 | 2/2004 |
| JP | 6012892 B1 | 10/2016 |

*Primary Examiner* — Freddie Kirkland, III
(74) *Attorney, Agent, or Firm* — Sughrue Mion, PLLC; Richard C. Turner

(57) ABSTRACT

To provide a controller and a control method for an internal combustion engine capable of detecting misfire with good accuracy by simple calculation, even when a vibration in a period of about several strokes occurs in the crankshaft. A controller and a control method for an internal combustion engine detects crank angle based on an output signal of the specific crank angle sensor 6, and calculates a crank angle speed, a crank angle acceleration, and a crank angle jerk which is a time change rate of the crank angle acceleration; calculates a fluctuation amount of the crank angle jerk in a determination period which is set corresponding to a one combustion stroke based on the crank angle jerk; and determines a presence/absence of misfire in the one combustion stroke based on the fluctuation amount of the crank angle jerk.

8 Claims, 7 Drawing Sheets

(51) Int. Cl.
*B60W 10/06* (2006.01)
*G01M 15/11* (2006.01)

(56) References Cited

U.S. PATENT DOCUMENTS

| | | | |
|---|---|---|---|
| 10,208,692 B2* | 2/2019 | Saiki | F02D 41/22 |
| 10,378,468 B2* | 8/2019 | Minatoya | F02D 41/1498 |
| 10,408,151 B2* | 9/2019 | Hotta | F02D 45/00 |
| 2007/0157713 A1* | 7/2007 | Tsukamoto | G01M 15/11 |
| | | | 73/114.04 |
| 2012/0232774 A1* | 9/2012 | Minatoya | F02D 41/1498 |
| | | | 701/105 |
| 2013/0190962 A1* | 7/2013 | Yokouchi | B60K 6/445 |
| | | | 701/22 |
| 2017/0204795 A1 | 7/2017 | Hagari et al. | |
| 2017/0276083 A1* | 9/2017 | Saiki | F02D 41/22 |
| 2017/0276084 A1* | 9/2017 | Saiki | F02D 41/0007 |
| 2018/0087462 A1* | 3/2018 | Hotta | F02D 41/1498 |
| 2019/0128199 A1* | 5/2019 | Hotta | F02D 41/1497 |
| 2019/0128779 A1* | 5/2019 | Hotta | G01M 15/11 |

* cited by examiner

| ANGLE IDENTIFICATION NUMBER | n | 1 | 2 | ⋯ | n−1 | n | n+1 | ⋯ | 90 |
|---|---|---|---|---|---|---|---|---|---|
| CORRECTION VALUE | Kc | Kc(1) | Kc(2) | ⋯ | Kc(n−1) | Kc(n) | Kc(n+1) | ⋯ | Kc(90) |

CONTROLLER AND CONTROL METHOD FOR INTERNAL COMBUSTION ENGINE

INCORPORATION BY REFERENCE

The disclosure of Japanese Patent Application No. 2017-234809 filed on Dec. 7, 2017 including its specification, claims and drawings, is incorporated herein by reference in its entirety.

BACKGROUND

The present disclosure relates to a controller and a control method for an internal combustion engine that is provided with a plurality of detected units provided in a rotation member, which rotates integrally with a crankshaft, at a plurality of preliminarily set crank angle, and a specific crank angle sensor which is fixed to a nonrotation member and detects the detected unit.

The technology described in JP 6012892B is already known, concerning the above controller. In the technology of JP 6012892 B, the crank angle speed, the crank angle acceleration, and the crank angle jerk are calculated based on the output signal of the crank angle sensor; the error of the crank angle interval is corrected based on the crank angle jerk; and the cylinder internal pressure is estimated based on the crank angle speed and the crank angle acceleration after correction. Although it is described in the paragraph 0119 of JP 6012892 B that misfire detection may be performed using this technology, any concrete method of misfire detection is not described.

About misfire detection, for example, the technology described in JP 3495463 B is already known. JP 3495463 B describes a method for calculating TL(i) which shows a period from B76 to B06, TU(i) which shows a period from B06 to B76, TA(i) which shows a period from B76 to B76, and TS(i) which shows a period from B06 to B06, based on a BTDC 76 degrees signal (hereinafter, B76) and a BTDC 6 degrees signal (hereinafter, B06), and further calculating an angular acceleration α and a period ratio S based on these to perform misfire detection.

SUMMARY

Then, the inventor of the present disclosure studied performing misfire detection by combining these technologies. For example, the inventor studied calculating each above-mentioned period (TL, TU, TA, TS) concerning B76 and B06 (or edges in their vicinity) and the angular acceleration α, which are the technology of JP 3495463 B, based on a crank angle interval after correction whose error of the crank angle interval was corrected by the technology of JP 6012892 B; and performing misfire detection based on it. However, in a case where a motor generator and an internal combustion engine are connected like a hybrid vehicle, a resonance may occur at a specific rotational speed of the internal combustion engine, and a cycle variation may be superimposed on the rotational speed of the internal combustion engine. In this method, there is a problem that accuracy of misfire detection is deteriorated.

This cause is considered as follows. First, comparing the rotational speed of the internal combustion engine at the time of burning in the last stroke with the rotational speed at the time of burning in the present stroke, when they are almost the same rotational speed, the angular acceleration α calculated based on TA(i) becomes α≈0; when accelerating, it becomes α>0; and when decelerating, it becomes α<0. When it changes from non-misfire combustion stroke to misfire combustion stroke, it becomes α<0; and when it changes from misfire combustion stroke to non-misfire combustion stroke, it becomes α>0. Therefore, when there is a larger angular acceleration change than the certain boundary, it is determined that misfire occurred. Depending on a pattern of misfire like a continuous misfire or an intermittent misfire, more complicated determination pattern and threshold value are prepared; and also when these are matched, it is determined that misfire occurred. When a resonance between the motor generator and the internal combustion engine occurs in a period of about several strokes of the internal combustion engine with a larger amplitude than a drop of the rotational speed of the internal combustion engine at the time of misfire, the angular acceleration α by misfire is buried in the resonance of the motor generator and the internal combustion engine; as a result, the accuracy of misfire detection is deteriorated. Even in this case, although misfire is detectable if more complicated determination pattern and threshold value are prepared, if such complicated determination pattern is used, increase of a matching man hour and misfire erroneous detection will cause. Therefore, it is required to detect misfire with good accuracy by simple calculation.

A cylinder internal pressure can be estimated with the technology disclosed in JP 6012892 B, and misfire detection can also be performed based on this pressure. However, for example, when using this technology only for misfire detection, there is a problem that an arithmetic amount increases.

Hence, it is desirable to provide a controller and a control method for an internal combustion engine capable of detecting misfire with good accuracy by simple calculation, even when a vibration in a period of about several strokes occurs in the crankshaft.

A controller for an internal combustion engine according to the present disclosure is a controller for an internal combustion engine that is provided with a plurality of detected units provided in a rotation member, which rotates integrally with a crankshaft, at a plurality of preliminarily set crank angle, and a specific crank angle sensor which is fixed to a nonrotation member and detects the detected unit, the controller for the internal combustion engine including:

an angle information calculation unit that detects a crank angle based on an output signal of the specific crank angle sensor, and calculates a crank angle speed which is a time change rate of the crank angle, a crank angle acceleration which is a time change rate of the crank angle speed, and a crank angle jerk which is a time change rate of the crank angle acceleration; and a misfire determination unit that calculates a fluctuation amount of the crank angle jerk in a determination period which is set corresponding to one combustion stroke of the internal combustion engine, based on the crank angle jerk, and determines presence/absence of a misfire in the one combustion stroke based on the fluctuation amount of the crank angle jerk.

A control method for an internal combustion engine according to the present disclosure is a control method for an internal combustion engine that is provided with a plurality of detected units provided in a rotation member, which rotates integrally with a crankshaft, at a plurality of preliminarily set crank angle, and a specific crank angle sensor which is fixed to a nonrotation member and detects the detected unit, the control method for the internal combustion engine including:

an angle information calculation step that detects a crank angle based on an output signal of the specific crank angle sensor, and calculates a crank angle speed which is a time change rate of the crank angle, a crank angle acceleration which is a time change rate of the crank angle speed, and a crank angle jerk which is a time change rate of the crank angle acceleration; and a misfire determination step that calculates a fluctuation amount of the crank angle jerk in a determination period which is set corresponding to one combustion stroke of the internal combustion engine, based on the crank angle jerk, and determines presence/absence of a misfire in the one combustion stroke based on the fluctuation amount of the crank angle jerk.

According to the controller and the control method for the internal combustion engine concerning the present disclosure, since the presence/absence of misfire is determined based on the fluctuation amount of the crank angle jerk in the determination period which is set corresponding to the one combustion stroke, it is hardly influenced by vibration of about several strokes period, and misfire can be detected with good accuracy by simple calculation.

DETAILED DESCRIPTION OF THE EMBODIMENTS

1. Embodiment 1

Figure 1:
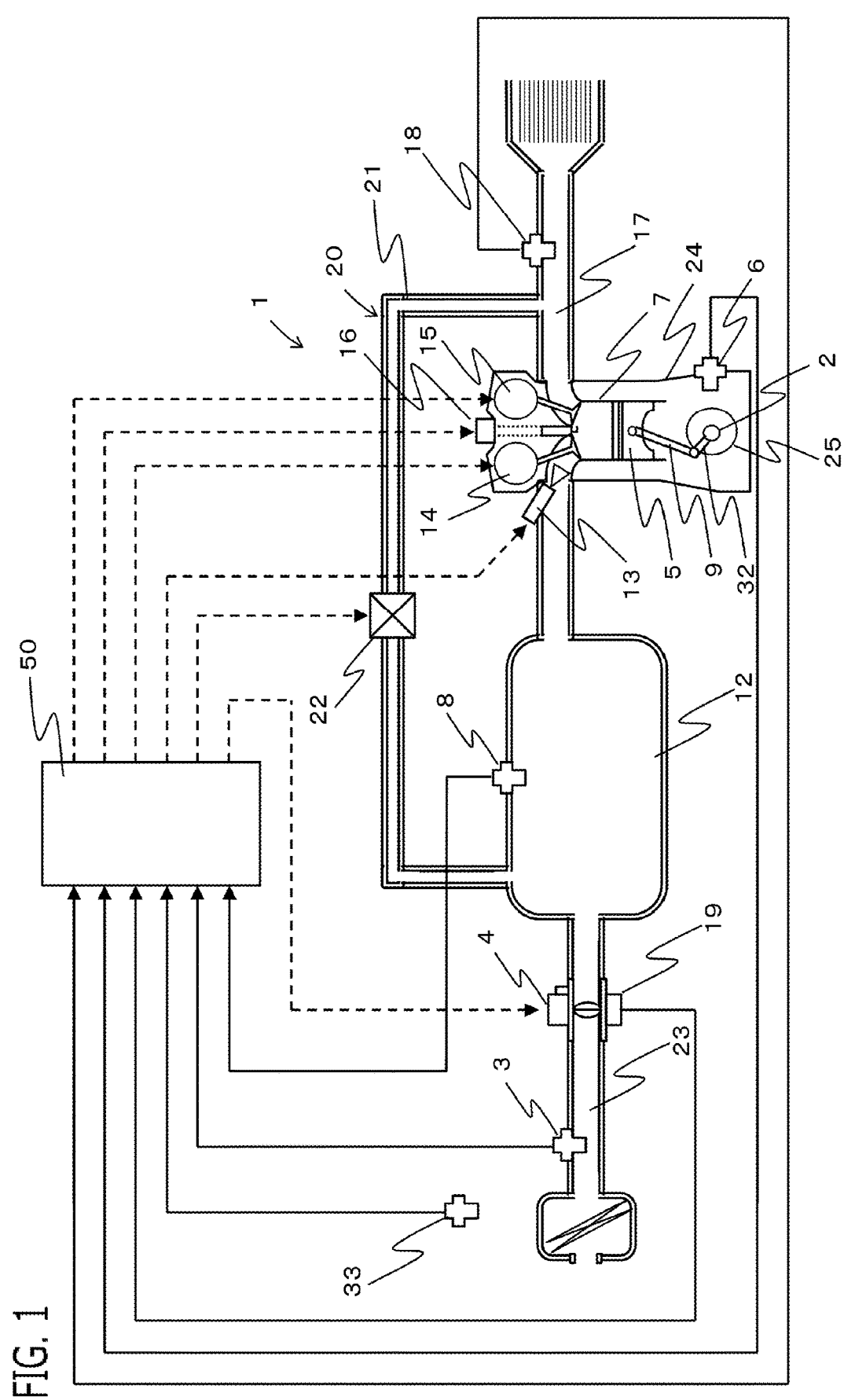
FIG. 1 is a schematic configuration diagram of an internal combustion engine and a controller according to Embodiment 1.
Figure 2:
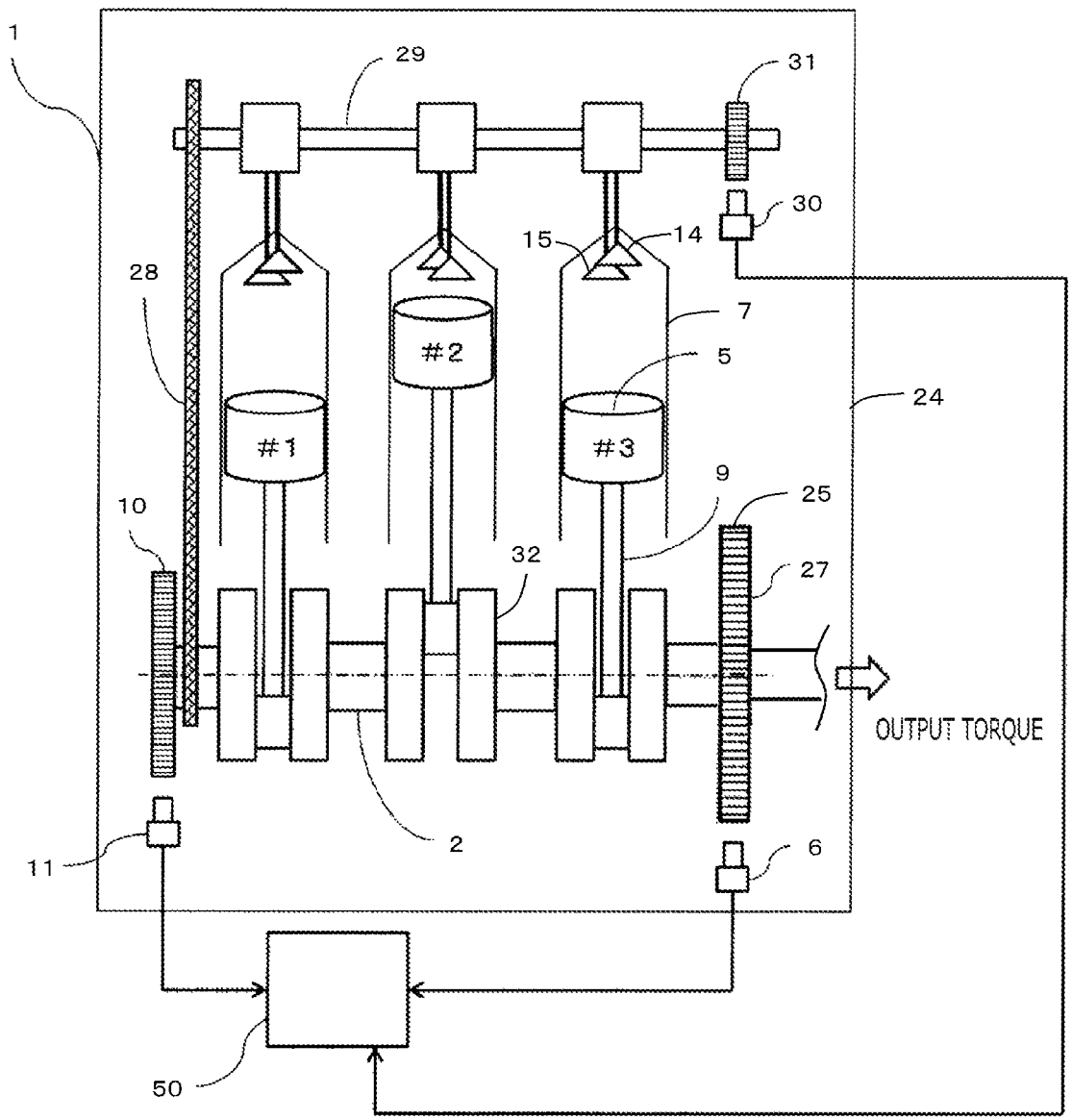
FIG. 2 is a schematic configuration diagram of an internal combustion engine and a controller according to Embodiment 1.
Figure 3:
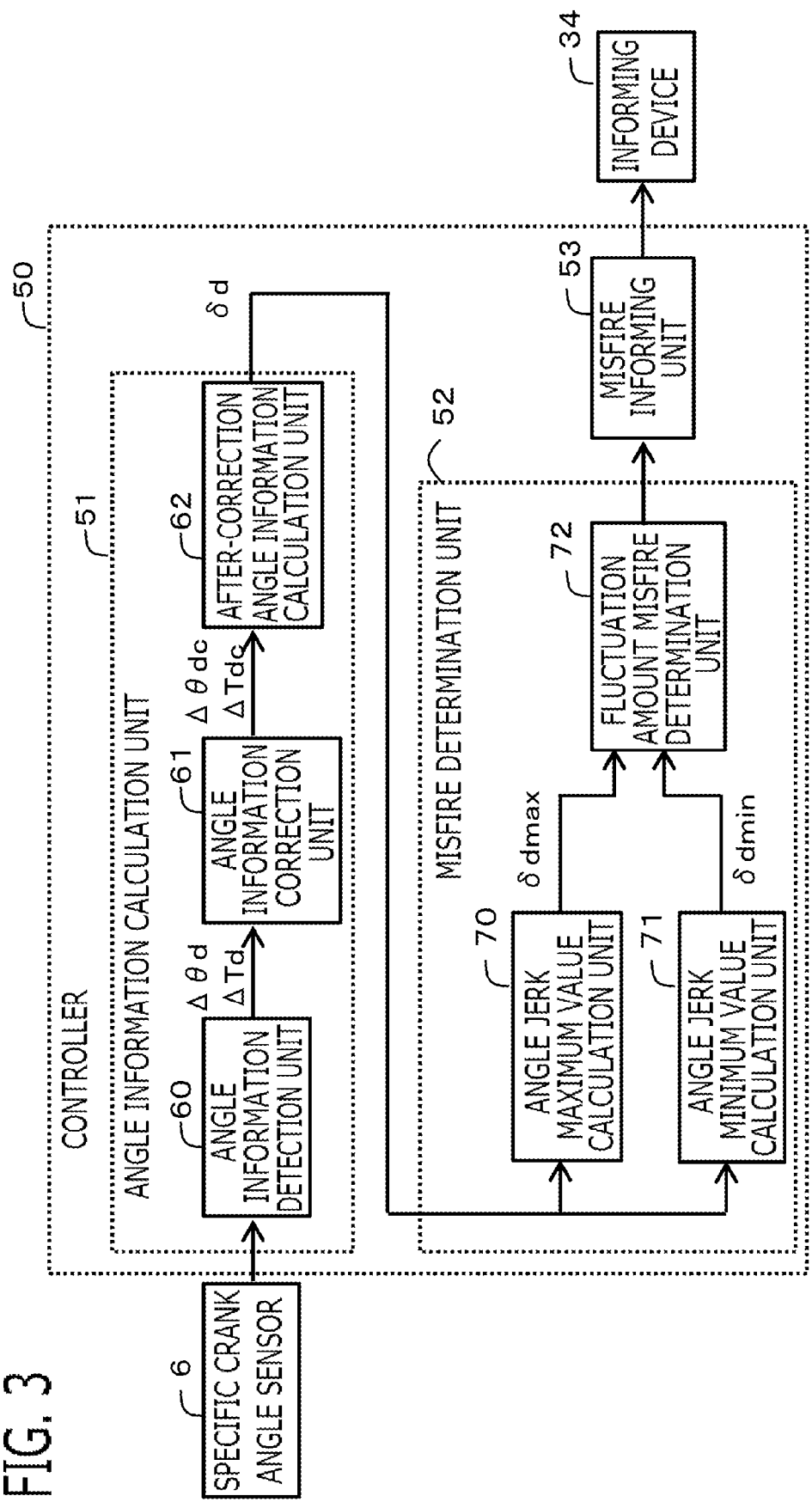
FIG. 3 is a block diagram of a controller according to Embodiment 1.

A controller 50 for an internal combustion engine (hereinafter, referred to simply as the controller 50) according to Embodiment 1 will be explained with reference to the drawings. FIG. 1 and FIG. 2 are a schematic configuration diagram of the internal combustion engine 1 and the controller 50; FIG. 3 is a block diagram of the controller 50 according to Embodiment 1. The internal combustion engine 1 and the controller 50 are mounted on a vehicle; the internal combustion engine 1 functions as a driving-force source for the vehicle (wheels).

1-1. Configuration of Internal Combustion Engine 1

The configuration of the internal combustion engine 1 will be explained. As shown in FIG. 1, the internal combustion engine 1 is provided with a cylinder 7 in which a fuel-air mixture is combusted. The internal combustion engine 1 is provided with an intake path 23 for supplying air to the cylinders 7 and an exhaust path 17 for discharging exhaust gas from the cylinders 7. The internal combustion engine 1 is a gasoline engine. The internal combustion engine 1 is provided with a throttle valve 4 which opens and closes intake path 23. The throttle valve 4 is an electronically controlled throttle valve which is opening/closing-driven by an electric motor controlled by controller 50. A throttle position sensor 19 which outputs an electric signal according to the opening degree of the throttle valve 4 is provided in the throttle valve 4.

An air flow sensor 3 which outputs an electric signal according to an intake air amount taken into the intake path 23 is provided in the intake path 23 at the upstream side of throttle valve 4. The internal combustion engine 1 is provided with an exhaust gas recirculation apparatus 20. The exhaust gas recirculation apparatus 20 has an EGR passage 21 which recirculates exhaust gas from the exhaust path 17 to the intake manifold 12, and an EGR valve 22 which opens and closes the EGR passage 21. The intake manifold 12 is a part of the intake path 23 at the downstream side of the throttle valve 4. The EGR valve 22 is an electronic controlled EGR valve which is opening/closing-driven by an electric motor controlled by controller 50. In the exhaust path 17, there is provided an air-fuel ratio sensor 18 which outputs an electric signal according to an air-fuel ratio of exhaust gas in the exhaust path 17.

A manifold pressure sensor 8 which outputs an electric signal according to a pressure in the intake manifold 12 is provided in the intake manifold 12. An injector 13 for injecting a fuel is provided at the downstream side part of the intake manifold 12. The injector 13 may be provided in such a way as to inject a fuel directly into the cylinder 7. An atmospheric pressure sensor 33 which outputs an electric signal according to an atmospheric pressure is provided in the internal combustion engine 1.

An ignition plug for igniting a fuel-air mixture and an ignition coil 16 for supplying ignition energy to the ignition plug are provided on the top of the cylinder 7. On the top of the cylinder 7, there are provided an intake valve 14 for adjusting the amount of intake air to be taken from the intake path 23 into the cylinder 7 and an exhaust valve 15 for adjusting the amount of exhaust gas to be exhausted from the cylinder to the exhaust path 17.

As shown in FIG. 2, the internal combustion engine 1 has a plurality of cylinders 7 (in this example, three). A piston 5 is provided inside of the each cylinder 7. The piston 5 of the each cylinder 7 is connected to a crankshaft 2 via a connecting rod 9 and a crank 32. The crankshaft 2 is rotated by reciprocating movement of piston 5. A combustion gas pressure which generated in the each cylinder 7 presses the top face of the piston 5, and rotates the crankshaft 2 via the connecting rod 9 and the crank 32. The crankshaft 2 is connected with a power transfer mechanism which transmits driving force to the wheels. The power transfer mechanism consists of a gearbox, a differential gear and the like. The vehicle provided with the internal combustion engine 1 may be a hybrid vehicle provided with a motor generator in the power transfer mechanism.

The internal combustion engine 1 is provided with a signal plate 10 which rotates integrally with the crankshaft 2. A plurality of teeth are provided in the signal plate 10 at a plurality of preliminarily set crank angles. In the present embodiment, the teeth of the signal plate 10 are arranged at intervals of 10 degrees. The teeth of the signal plate 10 are provided with a chipped tooth part in which a part of teeth is chipped. The internal combustion engine 1 is provided with a first crank angle sensor 11 which is fixed to an engine block 24 and detects the tooth of the signal plate 10.

The internal combustion engine 1 is provided with a cam shaft 29 connected with crankshaft 2 by a chain 28. The cam shaft 29 carries out the opening-and-closing drive of the intake valve 14 and the exhaust valve 15. During the crankshaft 2 rotates two times, the cam shaft 29 rotates once. The internal combustion engine 1 is provided with a signal plate 31 for cam which rotates integrally with the cam shaft 29. A plurality of teeth are provided in the signal plate 31 for cam at a plurality of preliminarily set cam shaft angles. The internal combustion engine 1 is provided with a cam angle sensor 30 which is fixed to an engine block 24 and detects the tooth of signal plate 31 for cam.

Based on two kinds of output signals of the first crank angle sensor 11 and the cam angle sensor 30, the controller 50 detects the crank angle on the basis of the top dead center of each piston 5 and determines the stroke of each cylinder 7. The internal combustion engine 1 is a 4-stroke engine which has an intake stroke, a compression stroke, a combustion stroke, and an exhaust stroke.

The internal combustion engine 1 is provided with a flywheel 27 which rotates integrally with the crankshaft 2. The peripheral part of flywheel 27 is a ring gear 25, and a plurality of teeth are provided in the ring gear 25 at a plurality of preliminarily set crank angles. The teeth of the ring gear 25 are arranged in the peripheral direction with equiangular intervals. In this example, 90 teeth are provided with intervals of 4 degrees. The teeth of ring gear 25 are not provided with a chipped tooth part. The internal combustion engine 1 is provided with a second crank angle sensor 6 which is fixed to the engine block 24 and detects the tooth of the ring gear 25. The second crank angle sensor 6 is disposed oppositely to the ring gear 25 with a space in radial-direction outside of the ring gear 25. The opposite side of the flywheel 27 to the crankshaft 2 is connected with the power transfer mechanism. Accordingly, the output torque of the internal combustion engine 1 passes through a part of the flywheel 27, and is transmitted to the wheels side.

Each of the first crank angle sensor 11, the cam angle sensor 30, and the second crank angle sensor 6 outputs an electric signal according to change of the distance between each sensor and tooth by rotation of the crankshaft 2. The output signal of each angle sensor 11, 30, 6 becomes a rectangular wave which a signal turns on or off when the distance between sensor and tooth is near or when the distance is far. An electromagnetic pickup type sensor is used for each angle sensor 11, 30, 6, for example.

Since the flywheel 27 (the ring gear 25) has larger number of teeth than the number of teeth of the signal plate 10, and there is also no chipped tooth part, it can expect high resolution angle detection. Since the flywheel 27 has larger mass than the mass of the signal plate 10 and high frequency oscillation is suppressed, it can expect high accuracy of angle detection.

In the present embodiment, the second crank angle sensor 6 corresponds to "a specific crank angle sensor" in the present disclosure, the flywheel 27 corresponds to the "a rotation member" in the present disclosure, the tooth of ring gear 25 provided in flywheel 27 corresponds to the "a detected unit" in the present disclosure, and the engine block 24 corresponds to the "a nonrotation member" in the present disclosure.

1-2. Configuration of Controller 50

Figure 4:
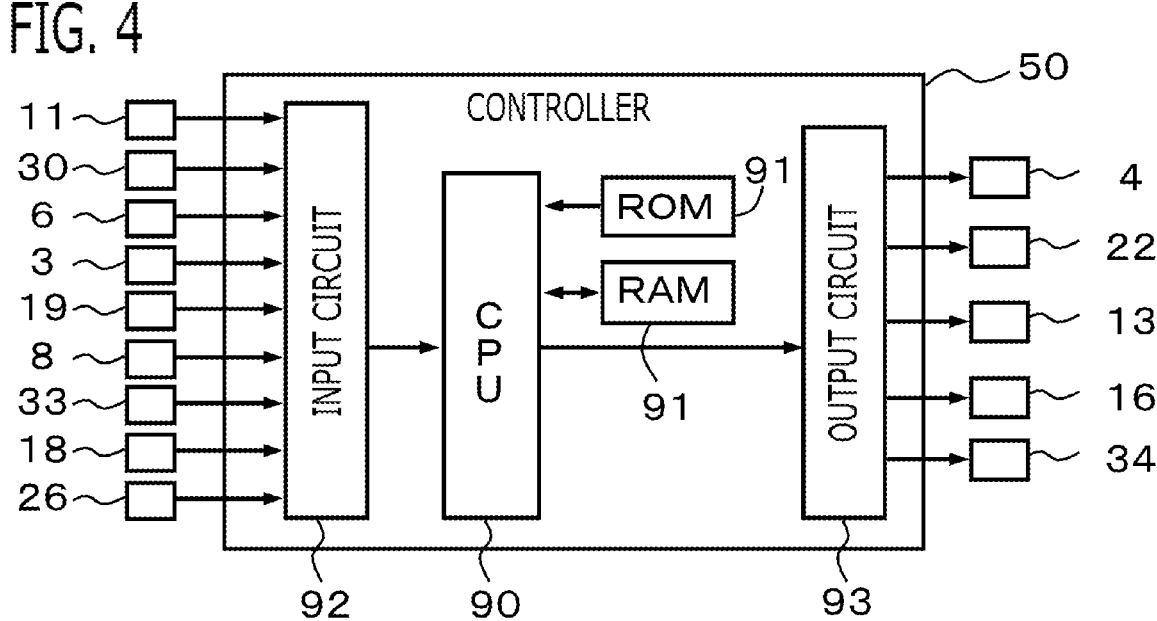
FIG. 4 is a hardware configuration diagram of a controller according to Embodiment 1.

Next, the controller 50 will be explained. The controller 50 is the one whose control subject is the internal combustion engine 1. As shown in FIG. 3, the controller 50 is provided with control units such as an angle information calculation unit 51, a misfire determination unit 52, and a misfire informing unit 53. The respective control units 51, 52, 53 and the like of the controller 50 are realized by processing circuits included in the controller 50. Specifically, as shown in FIG. 4, the controller 50 includes, as a processing circuit, a arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed.

As the storage apparatuses 91, there are provided a RAM (Random Access Memory) which can read data and write data from the arithmetic processor 90, a ROM (Read Only Memory) which can read data from the arithmetic processor 90, and the like. The input circuit 92 is connected with various kinds of sensors and switches and is provided with an A/D converter and the like for inputting output signals from the sensors and the switches to the arithmetic processor 90. The output circuit 93 is connected with electric loads and is provided with a driving circuit and the like for outputting a control signal from the arithmetic processor 90.

Then, the arithmetic processor 90 runs software items (programs) stored in the storage apparatus 91 such as a ROM and collaborates with other hardware devices in the controller 50, such as the storage apparatus 91, the input circuit 92, and the output circuit 93, so that the respective functions of the control units 51, 52, 53 included in the controller 50 are realized. Setting data items such as constant values, tables and determination values be utilized in the control units 51, 52, 53 are stored, as part of software items (programs), in the storage apparatus 91 such as a ROM. Data items such as a crank angle $\theta d$, a crank angle speed $\omega d$, a crank angle acceleration $\alpha d$, a crank angle jerk $\delta d$, respective computed values, and respective detection values, which the respective control units 51, 52, 53 calculated, are stored in the rewritable storage apparatus 91 such as a RAM.

In the present embodiment, the input circuit 92 is connected with the first crank angle sensor 11, the cam angle sensor 30, the second crank angle sensor 6, the air flow sensor 3, the throttle position sensor 19, the manifold pressure sensor 8, the atmospheric pressure sensor 33, the air fuel ratio sensor 18, an accelerator position sensor 26, and the like. The output circuit 93 is connected with the throttle valve 4 (electric motor), the EGR valve 22 (electric motor), the injector 13, the ignition coil 16, the informing device 34 and the like. The controller 50 is connected with various kinds of unillustrated sensors, switches, actuators, and the like. The controller 50 detects driving conditions of the internal combustion engines 1, such as an intake air amount, a pressure in the intake manifold 12, an atmospheric pressure, an air-fuel ratio, and an accelerator opening degree, based on the output signals of various sensors.

As basic control, the controller 50 calculates a fuel injection amount, an ignition timing, and the like, based on inputted output signals and the like from the various kinds of sensors, and then performs driving control of the injector 13, the ignition coil 16, and the like. Based on the output signal of the accelerator position sensor 26 and the like, the controller 50 calculates an output torque of the internal combustion engine 1 demanded by the driver, and then controls the throttle valve 4 and the like so that an intake air amount for realizing the demanded output torque is obtained. Specifically, the controller 50 calculates a target throttle opening degree and then performs driving control of the electric motor of the throttle valve 4 so that the throttle opening degree which is detected based on the output signal of the throttle position sensor 19 approaches the target throttle opening degree. And the controller 50 calculates a target opening degree of the EGR valve 22 based on inputted output signals and the like from the various kinds of sensors and then performs driving control of the electric motor of the EGR valve 22.

1-2-1. Angle Information Calculation Unit 51

The angle information calculation unit 51 detects a crank angle θd based on the output signal of the second crank angle sensor 6 used as the specific crank angle sensor, and calculates a crank angle speed ωd which is a time change rate of the crank angle θd, a crank angle acceleration αd which is a time change rates of the crank angle speed ωd, and a crank angle jerk δd which is a time change rates of the crank angle acceleration ad. In the present embodiment, the angle information calculation unit 51 is provided with an angle information detection unit 60, an angle information correction unit 61, and an after-correction angle information calculation unit 62; and corrects an error of the angle information caused by production variation of the teeth of the ring gear 25 and the like.

<Angle Information Detection Unit 60>

Figure 5:
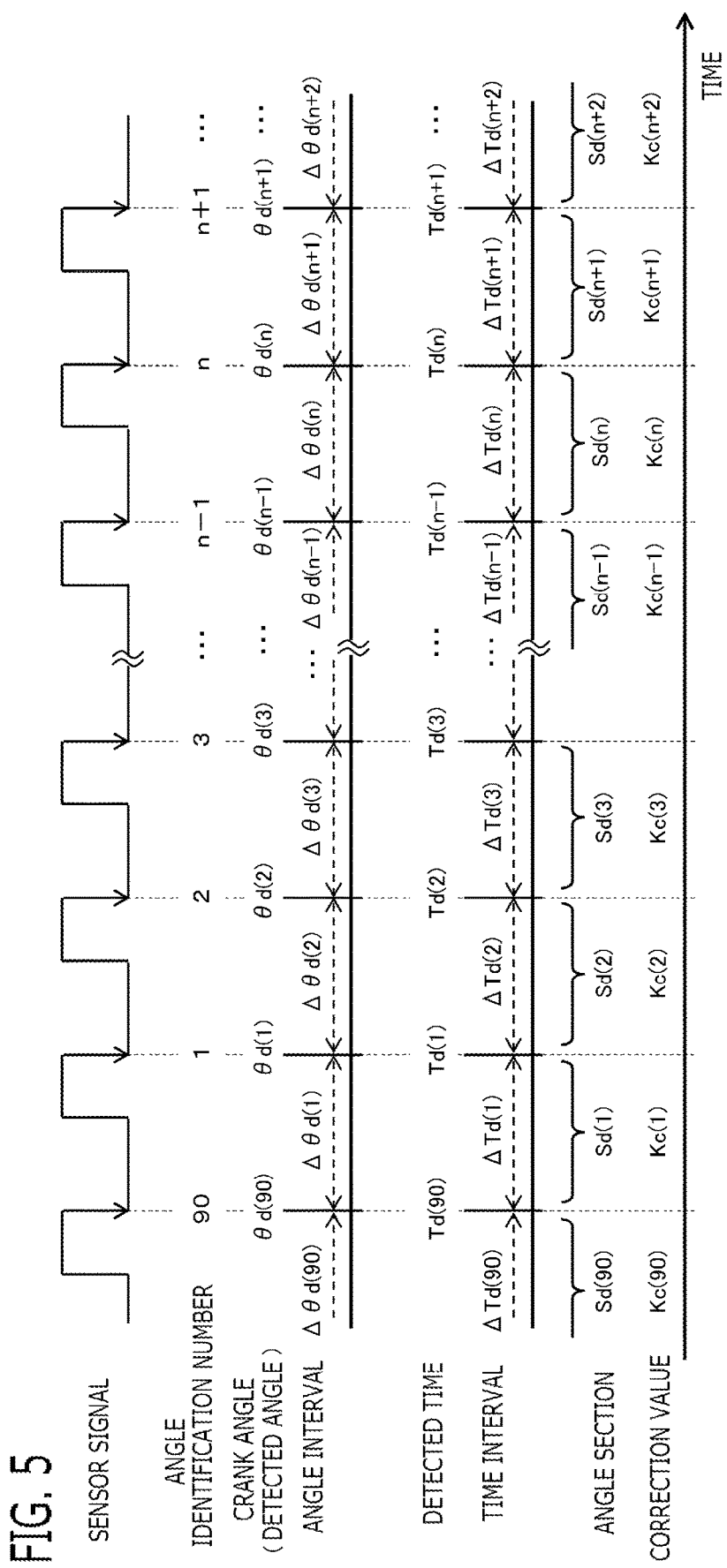
FIG. 5 is a time chart for explaining an angle information detection processing according to Embodiment 1.

As shown in FIG. 5, the angle information detection unit 60 detects the crank angle θd based on the output signal of the second crank angle sensor 6 and detects a detected time Td at which the crank angle θd is detected. Then, based on a detected angle θd which is the detected crank angle θd, and the detected time Td, the angle information detection unit 60 calculates an angle interval Δθd and a time interval ΔTd corresponding to an angle section Sd between the detected angles θd.

In the present embodiment, the angle information detection unit 60 determines the crank angle θd when a falling edge (or rising edge) of the output signal (rectangular wave) of the second crank angle sensor 6 is detected. The angle information detection unit 60 determines a basing point falling edge which is a falling edge corresponding to a basing point angle (for example, 0 degree which is a top dead center of the piston 5 of the first cylinder #1), and determines the crank angle θd corresponding to a number n of the falling edge which is counted up on the basis of the basing point falling edge (hereinafter, referred to as an angle identification number n). For example, when the basing point falling edge is detected, the angle information detection unit 60 sets the crank angle θd to the basing point angle (for example, 0 degree), and sets the angle identification number n to 0. Then, every time the falling edge is detected, the angle information detection unit 60 increases the crank angle θd by a preliminarily set angle interval Δθd (in this example, 4 degrees) and increases the angle identification number n by one. Alternatively, the angle information detection unit 60 may read out the crank angle θd corresponding to the this time identification number n, by use of an angle table in which a relationship between the angle identification number n and the crank angle θd is preliminarily set. The angle information detection unit 60 correlates the crank angle θd (the detected angle θd) with the angle identification number n. The angle identification number n returns to 1 after a maximum number (in this example, 90). The last time angle identification number n of the angle identification number n=1 is 90, and the next time angle identification number n of the angle identification number n=90 is 1.

In the present embodiment, as described later, the angle information detection unit 60 determines the basing point falling edge of the second crank angle sensor 6 with reference to a reference crank angle detected based on the first crank angle sensor 11 and the cam angle sensor 30. For example, the angle information detection unit 60 determines the falling edge at which the reference crank angle when the falling edge of the second crank angle sensor 6 is detected becomes the closest to the basing point angle, as the basing point falling edge.

The angle information detection unit 60 determines the stroke of each cylinder 7 corresponding to the crank angle θd with reference to the stroke of each cylinder 7 determined based on the first crank angle sensor 11 and the cam angle sensor 30.

The angle information detection unit 60 detects a detected time Td when the falling edge of the output signal (rectangular wave) of the second crank angle sensor 6 is detected, and correlates the detected time Td with the angle identification number n. Specifically, the angle information detection unit 60 detects the detected time Td using a timer function provided in the arithmetic processor 90.

As shown in FIG. 5, when the falling edge is detected, the angle information detection unit 60 sets the angle section between the detected angle θd (n) corresponding to the this time angle identification number (n) and the detected angle θd (n−1) corresponding to the last time angle identification number (n−1), as the angle section Sd (n) corresponding to the this time angle identification number (n).

As shown in an equation (1), when the falling edge is detected, the angle information detection unit 60 calculates a deviation between the detected angle θd (n) corresponding to the this time angle identification number (n) and the detected angle θd (n−1) corresponding to the last time angle identification number (n−1), and sets the calculated deviation as the angle interval Δθd (n) corresponding to the this time angle identification number (n) (the this time angle section Sd (n)).

$$\Delta\theta d(n)=\theta d(n)-\theta d(n-1) \quad (1)$$

In the present embodiment, since all the angle intervals between the teeth of ring gear 25 are made equal, the angle information detection unit 60 sets the angle interval Δθd of all the angle identification numbers n as a preliminarily set angle (in this example, 4 degrees).

As shown in an equation (2), when the falling edge is detected, the angle information detection unit 60 calculates a deviation between the detected time Td (n) corresponding to the this time angle identification number (n) and the detected time Id (n−1) corresponding to the last time angle identification number (n−1), and sets the calculated deviation as the time interval ΔTd (n) corresponding to the this time angle identification number (n) (the this time angle section Sd(n)).

$$\Delta Td(n)=Td(n)-Td(n-1) \quad (2)$$

Based on two kinds of output signals of the first crank angle sensor 11 and the cam angle sensor 30, the angle information detection unit 60 detects the reference crank angle on the basis of the top dead center of the piston 5 of the first cylinder #1, and determines the stroke of each cylinder 7. For example, the angle information detection unit 60 determines the falling edge just after the chipped tooth part of the signal plate 10 based on the time interval of the falling edge of the output signal (rectangular wave) of the first crank angle sensor 11. Then, the angle information detection unit 60 determines a correspondency between the each falling edge on the basis of the falling edge just after the chipped tooth part, and the reference crank angle on the basis of the top dead center, and calculates the reference crank angle on the basis of the top dead center when each falling edge is detected. The angle information detection unit 60 determines the stroke of each cylinder 7 based on a relationship between the position of the chipped tooth part in the output signal (rectangular wave) of the first crank angle sensor 11, and the output signal (rectangular wave) of the cam angle sensor 30.

<Angle Information Correction Unit 61>

The angle information correction unit 61 corrects the angle interval $\Delta\theta d$ or the time interval $\Delta Td$ in each of the angle sections Sd by a correction value Kc provided one corresponding to each of the angle sections Sd. This correction value Kc is for compensating for tiny variation of the angle interval of the teeth of the ring gear 25. If it is before attaching the ring gear 25 to the internal combustion engine 1, for example, using the ratio of the time interval $\Delta Td$ in each of the angle sections Sd to an average time interval when rotating the ring gear 25 with constant speed alone, the correction value Kc in each of the angle sections Sd is calculated previously, and it is memorized and used. If it is after attaching the ring gear 25 to the internal combustion engine 1, for example, under the condition which the internal combustion engine 1 is rotating with constant speed such as during fuel cut, the correction value Kc in each of the angle sections Sd may be changed so that the crank angle jerk in each of the angle sections Sd approaches zero, in the same manner as the technology disclosed in Japanese Patent Publication No. 6012892. As a simple method, instead of correcting by the correction value Kc, a moving average value or a weighted mean value of the time intervals $\Delta Td$ before and after the angle section Sd may be calculated as the corrected time interval $\Delta Tdc$ in each of the angle sections Sd.

Figures 6, 7:
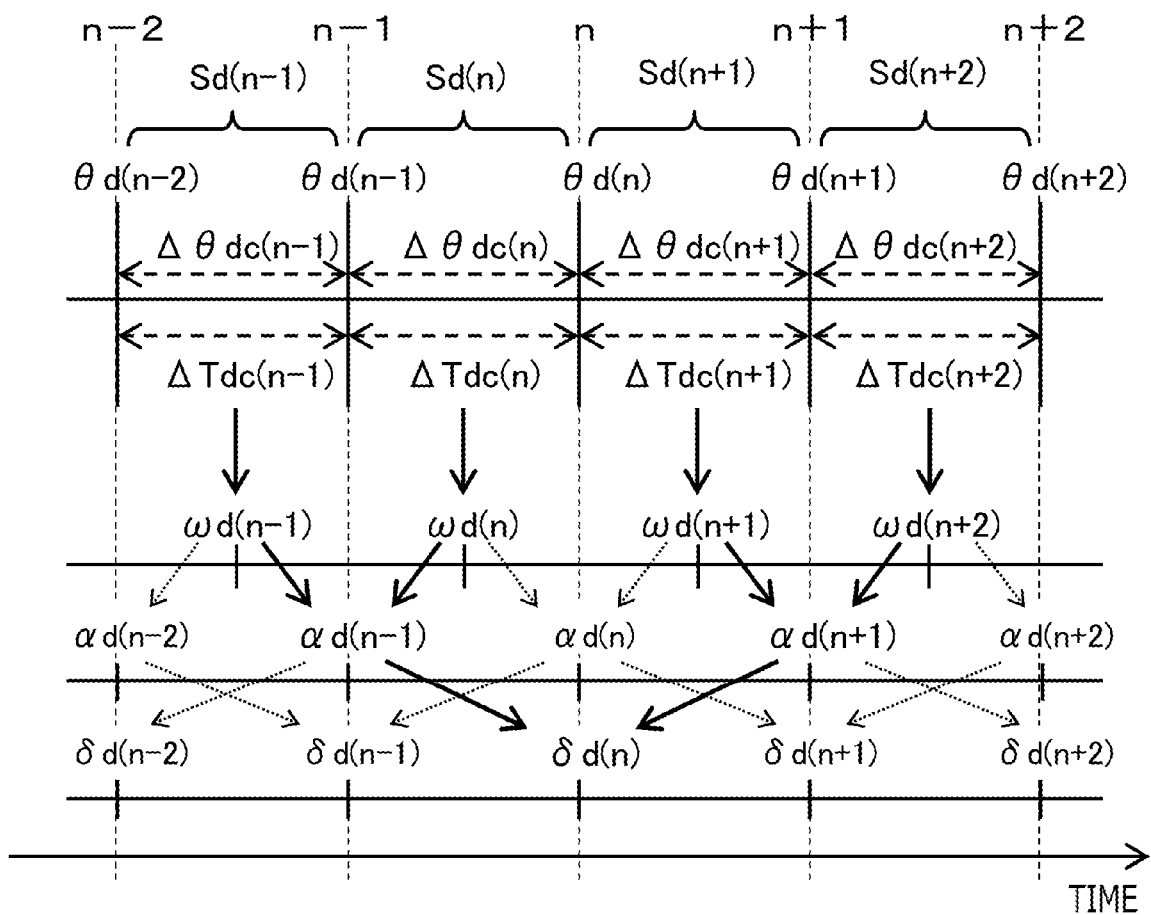
FIG. 6 is a figure for explaining a correction value stored in a storage apparatus according to Embodiment 1.
FIG. 7 is a time chart for explaining an angle information calculation processing according to Embodiment 1.

In the present embodiment, the angle information correction unit 61 provides one correction value Kc (n) in the every angle section Sd (n) of the each angle identification number n. In this example, since the angle identification number n and the angle section Sd are provided 90, the correction value Kc is also provided 90. As shown in FIG. 6, the each correction value Kc is correlated with the each angle identification number n, and is stored in the rewritable storage apparatus 91 such as RAM of the controller 50.

As shown in an equation (3), the angle information correction unit 61 multiplies the correction value Kc (n) corresponding to the this time angle identification number (n) to the angle interval $\Delta\theta d$ (n) or the time interval $\Delta Td$ (n) corresponding to the this time angle identification number (n), so as to calculate the corrected angle interval $\Delta\theta dc$ (n) or the corrected time interval $\Delta Tdc$ (n) corresponding to the this time angle identification number (n).

$$\Delta\theta dc(n) = Kc(n) \times \Delta\theta d(n)$$

or $$\Delta Tdc(n) = Kc(n) \times \Delta Td(n)$$

In the present embodiment, a case where the time interval $\Delta Td$ is corrected by the correction value Kc is explained. The angle interval $\Delta\theta d$ which is not corrected by the correction value Kc is also called as the corrected angle interval $\Delta\theta dc$, for convenience of explanation.

<After-Correction Angle Information Calculation Unit 62>

Based on the corrected angle interval $\Delta\theta dc$ and the corrected time interval $\Delta Tdc$ by the correction value Kc in each of the angle sections Sd, the after-correction angle information calculation unit 62 calculates a crank angle speed ω which is a time change rate of the crankshaft angle $\theta d$, a crank angle acceleration $\Delta d$ which is a time change rate of the crank angle speed ωd, and a crank angle jerk δd which is a time change rate of the crank angle acceleration $\Delta d$, corresponding to each of the detected angles $\theta d$ or the angle sections Sd.

In the present embodiment, as shown in FIG. 7, based on the corrected angle interval $\Delta\theta dc$ (n) and the corrected time interval $\Delta Tdc$ (n) corresponding to the angle section Sd (n) made into a processing object, the after-correction angle information calculation unit 62 calculates the crank angle speed ωd (n) corresponding to the angle section Sd (n) of the processing object. Specifically, as shown in an equation (4), the after-correction angle information calculation unit 62 calculates the crank angle speed ωd (n) by dividing the corrected angle interval $\Delta\theta dc$ (n) by the corrected time interval $\Delta Tdc$ (n) corresponding to the angle section Sd (n) of a processing object.

$$\omega d(n) = \Delta\theta dc(n)/\Delta Tdc(n) \quad (4)$$

Based on the crank angle speed ωd (n) and the corrected time interval $\Delta Tdc$ (n) corresponding to the just before one angle section Sd (n) of the detected angle $\theta d$ (n) made into a processing object, and the crank angle speed ωd (n+1) and the corrected time interval $\Delta Tdc$ (n+1) corresponding to the just after one angle section Sd (n+1) of the detected angle $\theta d$ (n) of the processing object, the after-correction angle information calculation unit 62 calculates the crank angle acceleration $\alpha d$ (n) corresponding to the detected angle $\theta d$ (n) of the processing object. Specifically, as shown in an equation (5), the after-correction angle information calculation unit 62 calculates the crank angle acceleration $\alpha d$ (n) by dividing a subtraction value obtained by subtracting the just before crank angle speed ωd (n) from the just after crank angle speed ωd (n+1), by an average value of the just after corrected time interval $\Delta Tdc$ (n+1) and the just before corrected time interval $\Delta Tdc$ (n).

$$\alpha d(n) = \{\omega d(n+1) - \omega d(n)\}/\{\Delta Tdc(n+1) + \Delta Tdc(n)\} \times 2 \quad (5)$$

Specifically, as shown in an equation (6), the after-correction angle information calculation unit 62 calculate the crank angle jerk δd (n) of the object detected angle $\theta d$ (n) by dividing a subtraction value obtained by subtracting the just before crank angle acceleration $\alpha d$ (n−1) from the just after crank angle acceleration $\alpha d$ (n+1) of the object detected angle $\theta d$ (n), by a total value of the just after corrected time interval $\Delta Tdc$ (n+1) and the just before corrected time interval $\Delta Tdc$ (n) of the object detected angle $\theta d$ (n).

$$\delta d(n) = \{\alpha d(n+1) - \alpha d(n-1)\}/\{\Delta Tdc(n+1) + \Delta Tdc(n)\} \quad (6)$$

The angle information correction unit 61 and the after-correction angle information calculation unit 62 correct, in real time, the angle interval $\Delta\theta d$ or the time interval $\Delta Td$, which are calculated in real time, by the correction value Kc, and calculate the crank angle speed ωd, the crank angle acceleration $\alpha d$, and the crank angle jerk δd in real time. Each part of the angle information calculation unit 51 memorizes each calculated angle information to the storage apparatus 91.

1-2-2. Misfire Determination Unit 52
1-2-2-1. Principle of Misfire Determination A principle for determining the presence/absence of misfire by the crank angle jerk δd will be explained. Generally, an equation of motion around a rotation axis can be described as an equation (7).

$$I \times d\omega/dt = I \times \alpha = T \tag{7}$$

Here, I is an inertia, ω is an angle speed, α is an angle acceleration, and T is a torque. This equation can be interpreted that the rotation axis rotates with the angle acceleration in inverse proportion to a magnitude of inertia when torque is applied around the rotation axis, and that the rotation axis rotates with a constant angle speed when torque is not applied around the rotation axis.

If this equation is applied to around the crankshaft of internal combustion engine, it can be described as an equation (8).

$$Ieng \times d\Omega d/dt = Ieng \times \alpha d = Tg - Tload \tag{8}$$

Here, Ieng is an inertia of the internal combustion engine; ωd is a crank angle speed; αd is a crank angle acceleration; Tg is a torque generated by combustion; and Tload is a load torque and is a sum of all loads, such as a frictional resistance of the internal combustion engine and the power transfer mechanism, and a running resistance of the vehicle.

When interpreting this equation in the same manner as the equation (7), results are a little different between when the crank angle acceleration, and the generated torque and the load torque are considered by average values in one combustion stroke, and when they are considered by average values in one crank angle interval (in this example, 4 degrees), as follows.

<When Considered by Average Values in One Combustion Stroke>

Since the right side of the equation (8) becomes zero when an average value of the generated torque and an average value of the load torque in one combustion stroke coincide, it indicates that the internal combustion engine is rotating with a constant speed. This indicates a steady operation state where the rotational speed of the internal combustion engine is constant, for example. When Tg−Tload>0, the internal combustion engine is in the accelerating state, and when Tg−Tload<0, it is in the decelerating state. Since Tg=0 at the time of misfire, it is in the decelerating state. It can be said that this example which detects a misfire based on change of acceleration, deceleration, and steady between plural combustion strokes is a method as shown in the above-mentioned JP 3495463 B. However, since the internal combustion engine is an engine which generates torque intermittently, when torque change in one combustion stroke is observed in detail, condition will change a little.

<When Considered by Average Value in a Crank Angle Interval>

As mentioned above, since the internal combustion engine is an engine which generates torque intermittently, a quick burning period in which fuel-air mixture burns quickly and a non-quick burning period in which fuel-air mixture does not burn quickly exist even in one combustion stroke. Since a burning period is usually a period of about 40 to 60 degrees, generally, a non-burning period which fuel-air mixture does not burns becomes longer than the burning period in one combustion stroke (240 degrees for 3-cylinder engine, 180 degrees for 4-cylinder engine).

When considering the case where the internal combustion engine is operating steadily, although the average value of the generated torque and the average value of the load torque in one combustion stroke are the same, while the load torque is always applied, the generated torque by burning is generated in only a short period. That is, it can be said that the generated torque by burning becomes large momentarily. When considering in this way, even when the rotational speed of the internal combustion engine is constant, it is seen that the generated torque as the average value in the crank angle interval is largely changed in one combustion stroke. Since the generated torque becomes zero at the time of misfire, only the load torque is applied. Thus, if the torque fluctuation in one combustion stroke can be captured, it is seen that misfire detecting can be performed easily, without observing the acceleration and deceleration change between plural combustion strokes as the conventional technology.

<Calculation Equation of Torque Fluctuation>

A method for detecting the torque fluctuation in one combustion stroke will be explained. When considering again that inertia is constant in the equation (7), it is seen that torque and angle acceleration are in a proportional relation. Since change of torque is desired to be known now, the equation (9) obtained by further differentiating the equation (7) is considered.

$$I \times d\alpha/dt = I \times \delta dT/dt \tag{9}$$

δ is the angle jerk here. Since the equation (9) shows that a differential value of torque, that is, a time change rate of torque is proportion to the angle jerk; when this is considered around the crankshaft of the internal combustion engine, it can be said that torque fluctuation has a relation proportional to the crank angle jerk. That is, if fluctuation of the crank angle jerk in one combustion stroke can be captured, it means capturing the torque fluctuation in one combustion stroke, and the misfire detecting can be easily performed as above-mentioned.

Figure 8:
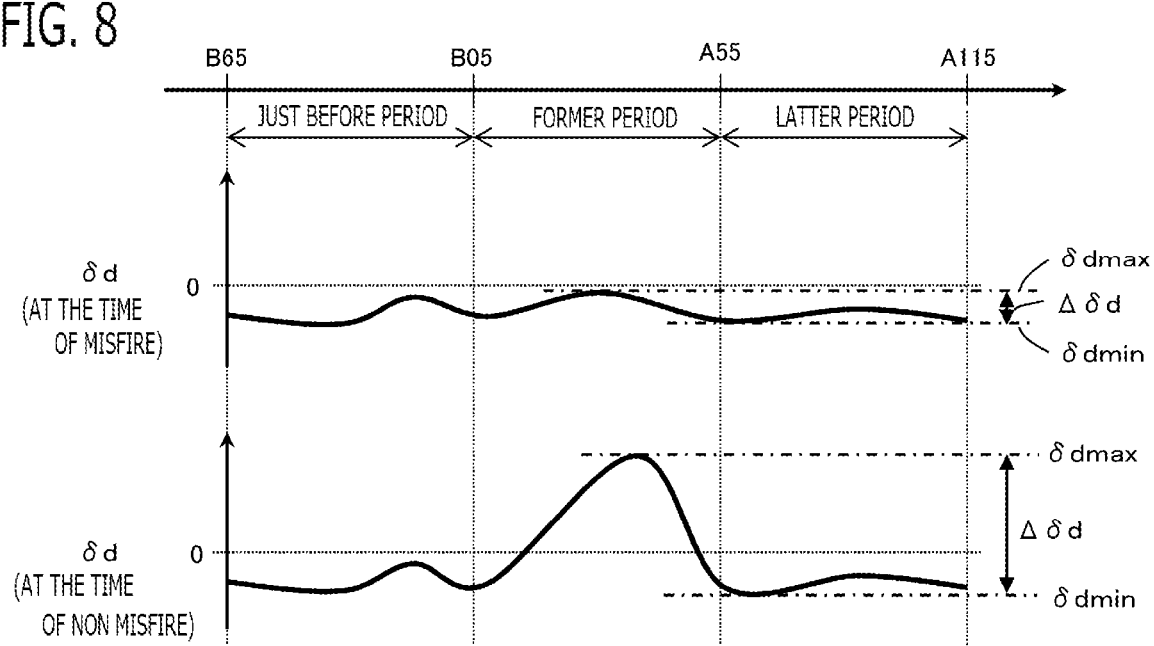
FIG. 8 is a figure for explaining of misfire detection according to Embodiment 1.

An example of change of the crank angle jerk is shown in FIG. 8. At the time of misfire, there is no large fluctuation in the crank angle jerk basically; fluctuation of the crank angle jerk in the quick burning period (for example, from B05 degrees to A55 degrees), and the burning just before period (for example, from B65 degrees to B05 degrees, which is before top dead center) and the non-quick burning period (for example, A55 degrees to A115 degrees, which is after burning) is small. Here, B represents BTDC (Before Top Dead Center), and A represents ATDC (After Top Dead Center). On the other hand, at the time of non-misfire, since the crank angle jerk in the quick burning period changes to the positive direction largely, fluctuation of the crank angle jerk becomes large. In order to detect a fluctuation amount of the crank angle jerk in one combustion stroke, for example, a difference Δδd between a maximum value δdmax of the crank angle jerk in the quick burning period, and a minimum value δdmin of the crank angle jerk in the burning just before period or the non-quick burning period may be calculated. Since it can be said that this crank angle jerk difference Δδd is proportional to the torque fluctuation in one combustion stroke, the presence/absence of misfire can be determined based on the crank angle jerk difference Δδd. By this method, the misfire erroneous detection which is the problem of the conventional method and is supposed to be caused by resonance between the motor generator and the internal combustion engine hardly occurs. Since this resonance is a vibration of several stroke periods, it does not appear as fluctuation of the crank angle jerk calculated in the crank angle interval.

1-2-2-2. Configuration of Misfire Determination Unit 52

Then, based on the principle of misfire determination explained above, the misfire determination unit 52 calculates a fluctuation amount of the crank angle jerk in a determination period which is set corresponding to one combustion stroke, based on the crank angle jerk δd, and determines the presence/absence of misfire in the one combustion stroke based on the fluctuation amount of the crank angle jerk. In the present embodiment, the misfire determination unit 52 is provided with an angle jerk maximum value calculation unit 70, an angle jerk minimum value calculation unit 71, and a fluctuation amount misfire determination unit 72.

<Angle Jerk Maximum Value Calculation Unit 70>

Based on the crank angle jerk δd calculated by the after-correction angle information calculation unit 62, the angle jerk maximum value calculation unit 70 calculates a maximum value δdmax of the crank angle jerk in the determination period which is set corresponding to the one combustion stroke. In the present embodiment, the angle jerk maximum value calculation unit 70 calculates a maximum value of the crank angle jerk δd in a former period which is set on a former side of the one combustion stroke, as the maximum value δmax of the crank angle jerk. The former period is preliminarily set corresponding to the quick burning period in which fuel-air mixture is burning quickly; and for example, it is preliminarily set to a period B05 degrees to A55 degrees. The angle jerk maximum value calculation unit 70 may change the former period according to operating conditions, such as ignition timing.

<Angle Jerk Minimum Value Calculation Unit 71>

Based on the crank angle jerk δd calculated by the after-correction angle information calculation unit 62, the angle jerk minimum value calculation unit 71 calculates a minimum value δmin of the crank angle jerk in the determination period which is set corresponding to the one combustion stroke. In the present embodiment, the angle jerk minimum value calculation unit 71 calculates a minimum value of the crank angle jerk δd in one or both of a just before period which is set to just before the former period and a latter period which is set to just after the former period, as the minimum value δdmin of the crank angle jerk (in this example, only the latter period). The just before period is preliminarily set corresponding to a period just before the quick burning period; and for example, it is preliminarily set to period B65 degrees to B05 degrees. The latter period is preliminarily set corresponding to the non-quick burning period in which fuel-air mixture is not burning quickly; and for example, it is preliminarily sets to period A55 degrees to A115 degrees. The angle jerk minimum value calculation unit 71 may change the just before period and the latter period according to operating conditions, such as ignition timing.

In the present embodiment, since the calculation processing of the maximum value is performed in the former period and the calculation processing of the minimum value is performed in one or both of the just before period and the latter period, it is not necessary to perform both of the calculation processing of the maximum value and the calculation processing of the minimum value over the whole of determination periods corresponding to the one combustion stroke (the just before period+the former period+the latter period), and processing can be made half.

<Fluctuation Amount Misfire Determination Unit 72>

The fluctuation amount misfire determination unit 72 calculates a difference Δδd (=δdmax−δdmin) between the maximum value δdmax of the crank angle jerk and the minimum value δdmin of the crank angle jerk, as the fluctuation amount Δδd of the crank angle jerk. Then, when the fluctuation amount Δδd of the crank angle jerk is larger than a preliminarily set misfire determination value, the fluctuation amount misfire determination unit 72 determines that misfire did not occur but burning was performed in the corresponding one combustion stroke; and when the fluctuation amount Δδd of the crank angle jerk is less than or equal to the misfire determination value, the fluctuation amount misfire determination unit 72 determines that misfire occurred and burning was not performed in the corresponding one combustion stroke. The fluctuation amount misfire determination unit 72 stores the determination result of misfire to the storage apparatus 91. For example, when determining that misfire occurred, the fluctuation amount misfire determination unit 72 stores the result of determining that misfire occurred, to the storage apparatus 91 by correlating with the cylinder number corresponding to the one combustion stroke determined that misfire occurred.

1-2-3. Misfire Informing Unit 53

The misfire informing unit 53 informs the determination result of misfire by the misfire determination unit 52 to a user via the informing device 34. For example, when the occurrence frequency of misfire is higher than a preliminarily set frequency determination value, the misfire informing unit 53 makes a failure warning lamp as the informing device 34 turn on. The misfire informing unit 53 displays information of the determination result of misfire on a display screen as the informing device 34 which is provided in a meter panel of a driver seat. The misfire informing unit 53 transmits the determination result of misfire as one of the failure information of OBD (On Board Diagnostic), to a vehicle diagnostic device as the informing device 34 which is connected to the vehicle.

1-2-4. Flowchart

Figure 9:
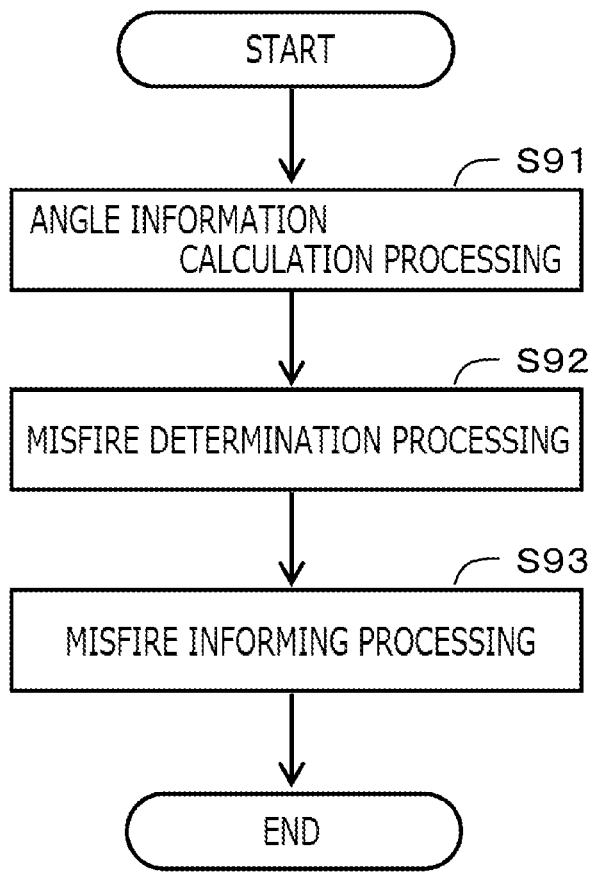
FIG. 9 is a flowchart showing a procedure of schematic processing according to Embodiment 1.

A procedure (a control method of internal combustion engine 1) of schematic processing of the controller 50 concerning the present embodiment will be explained based on the flow chart shown in FIG. 9. The processing represented in the flowchart in FIG. 9 is recurrently implemented, for example, every predetermined operation cycle while the arithmetic processor 90 implements software (a program) stored in the storage apparatus 91.

In the step S91, as mentioned above, the angle information calculation unit 51 implements an angle information calculation processing (an angle information calculation step) that detects the crank angle θd based on the output signal of the specific crank angle sensor 6, and calculates the crank angle speed ωd which is the time change rate of the crank angle θd, the crank angle acceleration ad which is the time change rates of the crank angle speed ωd, and the crank angle jerk δd which is the time change rates of the crank angle acceleration ad.

In the present embodiment, the angle information calculation unit 51 is provided with the angle information detection unit 60, the angle information correction unit 61, and the after-correction angle information calculation unit 62; and as described above, performs an error correction processing that corrects the error of the angle information.

In the step S92, as mentioned above, the misfire determination unit 52 implements a misfire determination processing (a misfire determination step) that calculates the fluctuation amount of the crank angle jerk in the determination period which is set corresponding to one combustion stroke, based on the crank angle jerk δd, and determines the presence/absence of misfire in the one combustion stroke based on the fluctuation amount of the crank angle jerk.

In the present embodiment, the angle jerk maximum value calculation unit 70 implements an angle jerk maximum value calculation processing (an angle jerk maximum value calculation step) that calculates the maximum value δdmax of the crank angle jerk in the determination period which is set corresponding to the one combustion stroke, based on the crank angle jerk δd.

The angle jerk minimum value calculation unit 71 implements an angle jerk minimum value calculation processing (an angle jerk minimum value calculation step) that calculates the minimum value δdmin of the crank angle jerk in the determination period which is set corresponding to the one combustion stroke, based on the crank angle jerk δd.

Then, the fluctuation amount misfire determination unit 72 calculates the difference Δδd between the maximum value δdmax of the crank angle jerk and the minimum value δdmin of the crank angle jerk, as the fluctuation amount Δδd of the crank angle jerk. When the fluctuation amount Δδd of the crank angle jerk is larger than the misfire determination value, the fluctuation amount misfire determination unit 72 determines that misfire did not occur and burning was performed; and when the fluctuation amount Δδd of the crank angle jerk is less than or equal to the misfire determination value, the fluctuation amount misfire determination unit 72 determines that misfire occurred and burning was not performed.

In the step S93, as mentioned above, the misfire informing unit 53 implements a misfire informing processing (a misfire informing step) that informs the determination result of misfire to user via the informing device 34.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In the above-mentioned Embodiment 1, there has been explained the case where the second crank angle sensor 6 corresponds to "the specific crank angle sensor" in the present disclosure, the flywheel 27 corresponds to "the rotation member" in the present disclosure, the tooth of ring gear 25 provided in flywheel 27 corresponds to the "the detected unit" in this present disclosure. However, embodiments of the present disclosure are not limited to the foregoing case. That is to say, the first crank angle sensor 11 may correspond to "the specific crank angle sensor" in the present disclosure, the signal plate 10 may correspond to "the rotation member" in the present disclosure, a plurality of teeth provided in the signal plate 10 may correspond to the "the detected unit" in the present disclosure.

(2) In the above-mentioned Embodiment 1, there has been explained the case where the internal combustion engine 1 is a gasoline engine. However, embodiments of the present disclosure are not limited to the foregoing case. That is to say, the internal combustion engine 1 may be various kinds of internal combustion engines, such as a diesel engine and an engine which performs HCCI combustion (Homogeneous-Charge Compression Ignition Combustion).

(3) In the above-mentioned Embodiment 1, there has been explained the case where the angle jerk maximum value calculation unit 70 calculates the maximum value of the crank angle jerk δd in the former period, as the maximum value δdmax of the crank angle jerk; and the angle jerk minimum value calculation unit 71 calculates the minimum value of the crank angle jerk δd in one or both of the just before period and the latter period, as the minimum value δdmin of the crank angle jerk. However, embodiments of the present disclosure are not limited to the foregoing case. That is to say, the angle jerk maximum value calculation unit 70 may calculate a maximum value of the crank angle jerk δd in the whole of determination periods corresponding to the one combustion stroke (for example, the former period+the latter period, or the just before period+the former period+the latter period), as the maximum value δdmax of the crank angle jerk. And, the angle jerk minimum value calculation unit 71 may calculate a minimum value of the crank angle jerk δd in the whole of determination periods corresponding to the one combustion stroke (for example, the former period+the latter period, or the just before period+the former period+the latter period), as the minimum value δdmin of the crank angle jerk.

Various modifications and alterations of this disclosure will be apparent to those skilled in the art without departing from the scope and spirit of this disclosure, and it should be understood that this is not limited to the illustrative embodiments set forth herein.

What is claimed is:

1. A controller for an internal combustion engine that is provided with a plurality of detected units provided in a rotation member, which rotates integrally with a crankshaft, at a plurality of preliminarily set crank angle, and a specific crank angle sensor which is fixed to a nonrotation member and detects the detected unit, the controller for the internal combustion engine comprising:
   an angle information calculator that detects a crank angle based on an output signal of the specific crank angle sensor, and calculates a crank angle speed which is a time change rate of the crank angle, a crank angle acceleration which is a time change rate of the crank angle speed, and a crank angle jerk which is a time change rate of the crank angle acceleration; and
   a misfire determination calculator that calculates a fluctuation amount of the crank angle jerk in a determination period which is set corresponding to one combustion stroke of the internal combustion engine, based on the crank angle jerk; and determines presence/absence of a misfire in the one combustion stroke based on the fluctuation amount of the crank angle jerk.

2. The controller for the internal combustion engine according to claim 1, wherein the misfire determination calculator calculates a maximum value of the crank angle jerk and a minimum value of the crank angle jerk in the determination period corresponding to the one combustion stroke based on the crank angle jerk, and calculates a difference between the maximum value of the crank angle jerk and the minimum value of the crank angle jerk, as the fluctuation amount of the crank angle jerk.

3. The controller for the internal combustion engine according to claim 2, wherein the misfire determination calculator calculates a maximum value of the crank angle jerk in a former period which is set on a former side of the one combustion stroke, as the maximum value of the crank angle jerk; and calculates a minimum value of the crank angle jerk in one or both of a just before period which is set to just before the former period and a latter period which is set to just after the former period, as the minimum value of the crank angle jerk.

4. The controller for the internal combustion engine according to claim 3, further comprising a misfire informing calculator that informs a determination result of misfire by the misfire determination calculator to a user via an informing device.

5. The controller for the internal combustion engine according to claim 2, further comprising a misfire informing calculator that informs a determination result of misfire by the misfire determination calculator to a user via an informing device.

6. The controller for the internal combustion engine according to claim 1, further comprising a misfire informing calculator that informs a determination result of misfire by the misfire determination calculator to a user via an informing device.

7. The controller for the internal combustion engine according to claim 1, wherein the misfire determination calculator determines that a misfire has not occurred based on the fluctuation amount of the crank angle jerk being greater than a reference value.

8. A control method for an internal combustion engine that is provided with a plurality of detected units provided in a rotation member, which rotates integrally with a crankshaft, at a plurality of preliminarily set crank angle, and a specific crank angle sensor which is fixed to a nonrotation member and detects the detected unit, the control method for the internal combustion engine comprising:

detecting a crank angle based on an output signal of the specific crank angle sensor, and calculating a crank angle speed which is a time change rate of the crank angle, a crank angle acceleration which is a time change rate of the crank angle speed, and a crank angle jerk which is a time change rate of the crank angle acceleration; and calculating a fluctuation amount of the crank angle jerk in a determination period which is set corresponding to one combustion stroke of the internal combustion engine, based on the crank angle jerk, and determining presence/absence of a misfire in the one combustion stroke based on the fluctuation amount of the crank angle jerk.

* * * * *